US012423030B2

United States Patent
Ramirez et al.

(10) Patent No.: US 12,423,030 B2
(45) Date of Patent: Sep. 23, 2025

(54) TRANSACTION REQUESTS ACCORDING TO A REQUEST ORDERING PROTOCOL

(71) Applicant: Arm Limited, Cambridge (GB)

(72) Inventors: Cesar Aaron Ramirez, Pflugerville, TX (US); Jamshed Jalal, Austin, TX (US); Mark David Werkheiser, Austin, TX (US)

(73) Assignee: Arm Limited, Cambridge (GB)

( * ) Notice: Subject to any disclaimer, the term of this patent is extended or adjusted under 35 U.S.C. 154(b) by 117 days.

(21) Appl. No.: 18/525,156

(22) Filed: Nov. 30, 2023

(65) Prior Publication Data
US 2025/0181271 A1    Jun. 5, 2025

(51) Int. Cl.
*G06F 3/06* (2006.01)
(52) U.S. Cl.
CPC .......... *G06F 3/0659* (2013.01); *G06F 3/0619* (2013.01); *G06F 3/0671* (2013.01)
(58) Field of Classification Search
None
See application file for complete search history.

(56) References Cited

U.S. PATENT DOCUMENTS 9,489,304 B1 * 11/2016 Swarbrick ............... G06F 13/00

FOREIGN PATENT DOCUMENTS

WO    2019211610 A1    11/2019

OTHER PUBLICATIONS

Robert Bedichek, "Some Efficient Architecture Simulation Techniques," Proceedings of the Winter 1990 USENIX Conference, Jan. 22-26, 1990, 12 pages.
AMBA AXI Protocol v1.0 Specification, ARM Limited, 2003, 108 pages.
AMBA AXI and ACE Protocol Specification, ARM Limited, 2003, 500 pages.

* cited by examiner

*Primary Examiner* — Scott C Sun
(74) *Attorney, Agent, or Firm* — NIXON & VANDERHYE P.C.

(57) ABSTRACT

There is provided an apparatus, a method, and a storage medium. The apparatus comprises one or more requestor devices to issue transaction requests, and one or more target devices to service those requests. The requestor devices and the target devices are configured to fulfil the requests according to a request ordering protocol specifying an ordered write observation behaviour in which, for each write transaction in a group of ordered write transactions, at least a deferred portion of the write transaction is deferred until all data specified in the group of ordered write transactions preceding the write transaction are observable. When implementing the request ordering protocol, the target devices are responsive to control information taking a first value to dynamically enable the ordered write observation behaviour, and the one or more target devices are responsive to the control information taking a second value to dynamically disable the ordered write observation behaviour.

20 Claims, 9 Drawing Sheets

TRANSACTION REQUESTS ACCORDING TO A REQUEST ORDERING PROTOCOL

TECHNICAL FIELD

The present invention relates to data processing. More particularly the present invention relates to apparatuses, methods, and non-transitory computer readable storage media.

BACKGROUND

Some apparatuses for data processing are provided with requestor devices and target devices. The requestor devices are those that issue transaction requests, for example write transactions, and the target devices are those that respond to the requests. In some use cases, the requestor devices and the target devices may adhere to a request ordering protocol. The request ordering protocol may allow a requestor device to ensure that a write transaction that it has issued is observable, for example, by itself or by another requestor device, before the requestor device issues a further write transaction. There may be overheads associated with adhering to the request ordering protocol.

SUMMARY

According to a first aspect of the present techniques there is provided an apparatus comprising:
one or more requestor devices each configured to issue transaction requests; and
one or more target devices configured to service the transaction requests,
wherein:
the one or more requestor devices and the one or more target devices are configured to fulfil the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable; and
when implementing the request ordering protocol, the one or more target devices are responsive to control information taking a first value to dynamically enable the ordered write observation behaviour, and the one or more target devices are responsive to the control information taking a second value to dynamically disable the ordered write observation behaviour.

According to a second aspect of the present techniques there is provided a method of operating the apparatus of the first aspect, the method comprising:
fulfilling the transaction requests according to the request ordering protocol; and
when implementing the request ordering protocol, dynamically enabling the ordered write observation in response to the control information taking the first value, and dynamically disabling the ordered write observation behaviour in response to the control information taking the second value.

According to a third aspect of the present techniques there is provided a non-transitory computer readable storage medium storing program instructions for controlling a host data processing apparatus to provide an instruction execution environment comprising:
one or more instances of requestor device program logic each configured to issue transaction requests; and
one or more instances of target device program logic configured to service the transaction requests,
wherein:
the one or more instances of requestor device program logic and the one or more instances of target device program logic are configured to fulfil the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable; and
when implementing the request ordering protocol, the one or more instances of target device program logic are responsive to control information taking a first value to dynamically enable the ordered write observation behaviour, and the one or more instances of target device program logic are responsive to the control information taking a second value to dynamically disable the ordered write observation behaviour.

According to a fourth aspect of the present techniques there is provided requestor device configured to issue transaction requests to be serviced by a target device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable,
wherein the requestor device is configured to maintain control information taking a first value to dynamically enable the ordered write observation behaviour when implementing the request ordering protocol, and the control information taking a second value to dynamically disable the ordered write observation behaviour when implementing the request ordering protocol.

According to a fifth aspect of the present techniques there is provided a method of operating the requestor device of the fourth aspect, the method comprising:
issuing transaction requests to be serviced by the target device according to the request ordering protocol; and
maintaining control information taking the first value to dynamically enable the ordered write observation behaviour when implementing the request ordering protocol, and the control information taking the second value to dynamically disable the ordered write observation behaviour when implementing the request ordering protocol.

According to a sixth aspect of the present techniques there is provided a non-transitory computer readable storage medium storing program instructions for controlling a host data processing apparatus to provide an instruction execution environment comprising program logic representative of the apparatus of the fourth aspect.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
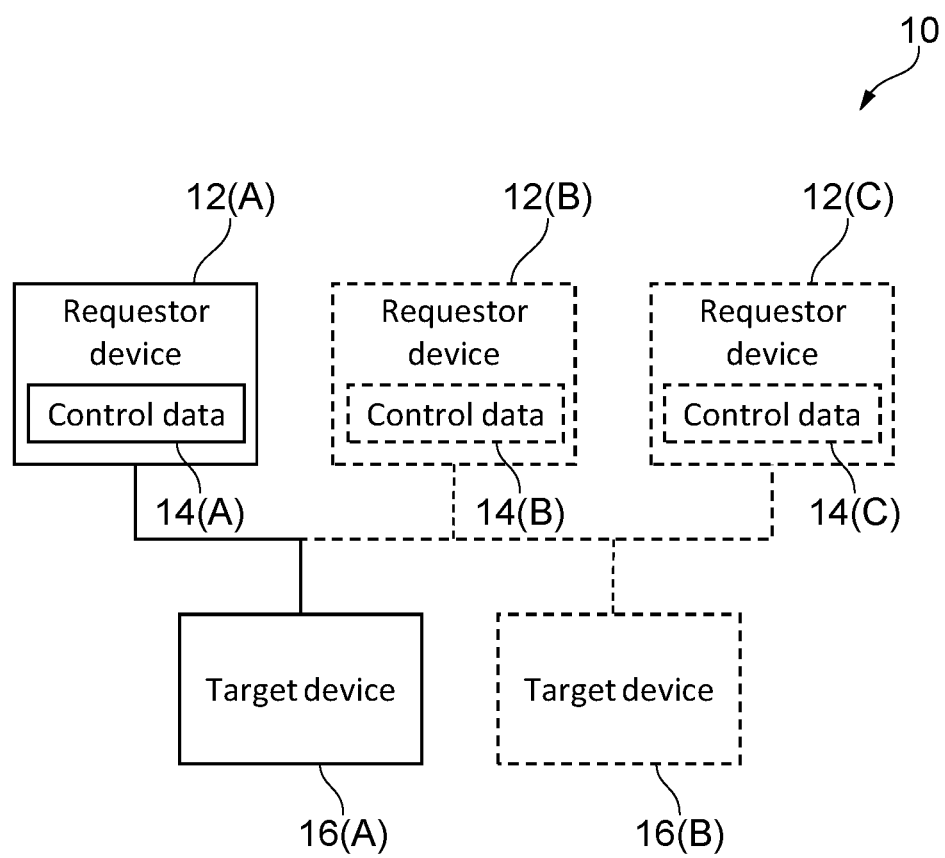
FIG. 1 schematically illustrates an apparatus according to some configurations of the present techniques.

Before discussing the configurations with reference to the accompanying figures, the following description of configurations is provided.

According to some configurations there is provided an apparatus comprising: one or more requestor devices each configured to issue transaction requests and one or more target devices configured to service the transaction requests. The one or more requestor devices and the one or more target devices are configured to fulfil the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction are observable. When implementing the request ordering protocol, the one or more target devices are responsive to control information taking a first value to dynamically enable the ordered write observation behaviour, and the one or more target devices are responsive to the control information taking a second value to dynamically disable the ordered write observation behaviour.

The use of separate requestor devices and target devices to fulfil transaction requests allows for a modular structure in which an apparatus, for example a data processing apparatus, can be provided with one or more of the requestor devices and one or more of the target devices according to the particular requirements of that apparatus. The requestor devices are devices that issue transaction requests, for example, read requests to read data and/or write requests to write data. The target devices are those that receive and service the transaction requests. For example, the target devices may cause data items requested as part of a transaction request to be retrieved from storage and returned to the requestor device, and/or may cause data items specified in a transaction request to be stored in storage. Because the transaction request is issued by one device (e.g., one of the one or more requestor devices) and fulfilled by a different device (e.g., one of the one or more target devices), there may be a delay between a transaction request being issued and that transaction being fulfilled. The delay may be due to latencies associated with the transmission of the request and/or latencies associated with fulfilling the request, for example, dependent on where data is stored or cached, or availability of data paths within the apparatus.

Transaction requests issued by the requestor device may, dependent on the particular use case, require that the transaction requests specifying data to be written are serviced in a strict order. For example, where a first transaction request requires storing data (writing data) and a second (subsequent) transaction request sets a value to indicate (for example, to a different requestor device) that the data has been written, the second request should not be serviced until the data specified in the first request is observable. Data specified to be written to an address region in a transaction request is considered to be observable once it is guaranteed that any requestor device attempting to issue a further transaction specifying the same address region will be serviced after the transaction request. In particular, if the further transaction request is a request to read from the address region, it is guaranteed that the read request will return the data specified to be written to the address region. In other words, the specified data does not have to have been written to be guaranteed as observable, rather all that is required is that no other transaction requests to the address region can be serviced ahead of writing of the data specified as to be written to the address region in the transaction request.

For this reason, the requestor device(s) and the target device(s) are configured to adhere to a request ordering protocol. The request ordering protocol may be any request ordering protocol that specifies how the requestor device(s) and the target device(s) are to handle transaction requests including, for example, both read requests and write requests. The request ordering protocol comprises an ordered write observation behaviour which enforces that write transactions that are within a same group (for example, sharing a same group identifier) are handled such that at least a portion of each write transaction is deferred until data identified in write transactions preceding that write transaction are observable.

In addition to use cases in which the above write ordering is required, there may be further use cases in which the order of write transactions is not required to be specified. For such use cases, there is a benefit in speed associated with allowing the write transactions to complete in any order. Whilst this could, in principle, be achieved by assigning each write transaction to a different write transaction group, such an approach results in increased overheads to generate and track group identifiers for each transaction. Another approach would be to provide a specific flag, for example that indicates that those writes are to be treated as being the only write of that group of ordered write transactions regardless as to whether or not this is actually the case. However, this approach may violate the strict ordering requirements in some request ordering protocols. A further approach would be to disable the entire request ordering protocol when the requestor device is operating in a use case for which the write ordering is not required. The inventors have recognised that it may not be desirable to switch the address ordering protocol off, because such a coarse grained approach may be detrimental to transactions issued by different threads of the requestor device, by different requestor devices, or issued by a same thread of the requestor device in parallel to the transactions for which write ordering is not required. Furthermore, whilst strict ordering of the writing may not be required, there may be use cases which require some ordering requirements defined in the request ordering protocol, but that do not require the ordered write observation behaviour. Therefore, the target devices are arranged to implement the request ordering protocol either with or without the ordered write observation behaviour being enabled. In other words, dependent on a value of control information, the ordered write observation behaviour can be dynamically switched on (enabled) or switched off (disabled). This enables the requestor and target devices to interact according to a request ordering protocol and to benefit from knowledge of how one another will handle transaction requests, whilst allowing the strict ordering associated with the ordered write observation behaviour to be dynamically switched, for example, based on a current use case of the requestor device.

The control information may be variously provided and in some configurations at least one of the one or more requestor devices is configured to identify a configuration register and the control information is stored in the configuration register. The configuration register may be provided as part of the requestor device or may be stored in a central location accessible to the requestor device. The control information may be provided as part of general configuration information relating to the requestor device, for example, the control information may be provided as a single bit of the configuration register or may be encoded into information stored in the configuration register. The configuration register may be accessible to all software operating on the requestor device. Alternatively, the configuration register may only be accessible to the requestor device when the requestor device is operating in a particular mode or at a minimum privilege level. The configuration register may be arranged to store control information for a number of different threads or contexts operating on the requestor device, for example, as identified by a context identifier or a thread identifier stored in association with the control information.

In some configurations the control information is dependent on the requestor device issuing the transaction request. In other words, the control information may be provided on a per requestor device basis with each requestor device able to specify whether the ordered write observation behaviour is enabled or disabled for that requestor device.

In some configurations the control information is dependent on a type of the requestor device issuing the transaction request. For example, simpler or legacy requestor devices may not be arranged to provide control information. For such requestor devices, it may be recognised that the absence of control information indicates a particular state of the ordered write observation behaviour. For example, for legacy devices or simpler devices, it may be inferred that the absence of particular control information indicates that the ordered write observation behaviour should be disabled. This may be particularly beneficial to legacy devices for which no ordering is required.

In some configurations the control information is identified on a per transaction request basis. For example, the control information may be encoded into the transaction request. For configurations in which a configuration register is used to store the control information, either globally or on a per requestor device basis, the configuration register may store default control information which is updated based on additional control information provided in the transaction request. As a result, the programmer or operating system is able to provide default control information indicating whether the ordered write observation behaviour is enabled or disabled and, in addition, may be able to overwrite this information on a per transaction request basis.

In some configurations the one or more requestor devices are coupled to the one or more target devices via at least one bridge, and the at least one bridge is configured, when the ordered write observation behaviour is enabled, to buffer the deferred portion until all data specified in the write transactions preceding the write transaction are observable. The bridge may provide a number of channels for transaction requests to be passed between the requestor device and the target devices, for example, a write channel and a read channel may be provided along with one or more control channels. The channels may be bi-directional channels or single directional channels. The bridge may be provided with buffer circuitry to store the deferred portion until it is confirmed that the write transactions preceding the write transaction are observable. A bridge may be provided for each requestor device with the buffer circuitry being dynamically enabled or disabled by the control information.

The group of ordered transactions may be defined in various ways. For example, transaction issued by a same requestor may be grouped into a same group. In some configurations each of the transaction requests specifies a transaction group identifier identifying the group of ordered write transactions and transaction requests specifying a same transaction group identifier are issued by the requestor device in order; and the ordering protocol allows transaction requests specifying a first transaction group identifier to be fulfilled out of order relative to transaction requests specifying a second transaction group identifier different to the first transaction group identifier. The ordering protocol may be arranged such that ordering, including ordering of write transactions in the ordered write observation behaviour, is only imposed on transaction requests issued with the same transaction group identifier. The group identifier may be generated by the requestor device. Alternatively, the group identifier may be generated by the target device in response to an initiation signal indicative of a transaction request issued by the requestor device.

In some configurations the control information is specified on a transaction group identifier basis. The combination of the use of group identifiers and control information to specify whether the ordered write observation behaviour is enabled or disabled on a group identifier basis provides a particularly flexible solution in which a requestor device is able to specify some groups in which the ordered write observation is required and some groups in which the ordered write observation is not required. As a result, the requestor device can benefit from ordered write observation where it is necessary for the ordering of data transactions and can avoid this feature, whilst still benefitting from other ordering features of the request ordering protocol, when it is appropriate to do so.

In some configurations the request ordering protocol specifies at least one ordering constraint to be applied independent of the control information. The ordering constraint may relate to an ordering of read requests, an ordering of write requests, or a relative ordering of requests relating to different requestor devices and/or different target devices.

In some configurations, the at least one ordering constraint comprises a read ordering constraint. The read ordering constraint may specify that the order in which transaction requests specifying data to be read are transmitted from the requestor device to the target device based on an order in which the transaction requests are issued by the requestor device.

In some configurations the at least one ordering constraint comprises a write ordering constraint requiring that each write transaction in the group of ordered write transactions is issued to the target device in order. In other words, the order that the target device receives the issued transaction requests is the order in which the requestor device issued the transaction requests.

The request ordering protocol may be provided at various levels of granularity. For example, ordering may be imposed across the whole system. In some configurations the request ordering protocol allows transaction requests issued by a first requestor device to be fulfilled out of order relative to transaction requests issued by a second requestor device. The transaction requests issued by the requestor devices may be identified by a requestor identifier and a transaction group identifier. The ordering protocol may specify the ordering of requests issued having a same requestor identifier and/or may specify the ordering of requests issued having both of a same requestor identifier and a same transaction group identifier.

Whilst the portion of the transaction request that is deferred may be the entire transaction request. In some configurations, the write transaction comprises a request portion and a data portion, and the request portion is permitted to proceed without deferral. The request portion may be transmitted from the requestor device to the target device through a different channel to the data portion. The request portion may include a transaction identifier and may identify a region of memory that the transaction request is associated with. For example, where the transaction request is a write transaction, the request portion may identify an address region of memory that data, to be provided in the data portion, is to be written to. The data portion may include the transaction identifier to associated the data portion with the transaction and with the request portion. Allowing the request portion to proceed without deferral allows the target device to prepare to receive the data specified in the data portion. Whilst the transaction identifier may be determined by the requestor device, in some configurations, the transaction identifier may be determined by the target device in response to receipt of the request portion. The transaction identifier may be transmitted back to the requestor device to be provided in the data portion to associate the data in the data portion with that request. Allowing at least the request portion of the transaction request to proceed without deferral improves the overall throughput and efficiency of the transactions.

The deferred portion can be any portion of the transaction request. In some configurations, the deferred portion is the data portion. The data portion of the transaction request may be buffered, for example, in the target device, the requestor device, or a bridge connecting the requestor device and the target device, until it is determined that the data associated with preceding write transactions are observable. Deferring the data portion of the transaction request until all data specified in write transactions of the group of ordered write transactions preceding the write transaction are observable ensures that the deferred data portion cannot become observable before the preceding write transactions. For example, in a use case where two write transactions, transaction A and transaction B, are specified as belonging to a group of ordered write transactions, transaction A is issued prior to transaction B. The request portion of transaction A is issued by a requestor device and is transferred to the target device. The target device may respond, for example, by returning a transaction identifier which can be attached to the data portion of transaction A. The request portion may specify the addresses that the data provided in the data portion are to be written to. The requestor device then transmits the data portion to the target device which then writes the data included in the data portion to the addresses identified in the request portion of transaction A. The second transaction, transaction B, is issued by the requestor device at some point subsequent to transaction A. Transaction B follows a similar pattern to transaction A with a request portion of transaction B being issued to the target device. The target device may respond with a second transaction identifier which can be attached to the data portion of transaction B. The requestor device receives the second transaction identifier but defers issuing the data portion to the target device until the requestor device receives confirmation from the target device that the data portion of transaction A is now observable. This ensures that the data portion of transaction B cannot become observable before the data portion of transaction A. This approach results avoids premature transmission of the data portion of transaction B and avoids the need for the data portion of transaction B to be buffered (either by a bridge connecting the target device to the requestor device or by the target device itself) pending the observability of the data portion of transaction A. Where the ordered write observation is disabled, the request portions issue in order with no dependency and the data portion issues in order, but with no dependency. Advantageously the data now is sent earlier than it would be if the ordered write observation behaviour were to be enabled. However, as the ordered write observation behaviour is disabled, the data may become observable out of order.

In some configurations the write transaction comprises an acknowledgement portion, and the deferred portion is the acknowledgement portion. The transaction request therefore may be comprised of a request portion, a data portion, and an acknowledgement portion. The data portion may be issued by the requestor device to the target device without being deferred. The target device may defer completing a write transaction until the acknowledgement portion is received. Considering the above example of two transactions, transaction A and transaction B, where transaction B is issued after transaction A. Transaction A is not observable until the requestor device has issued the acknowledgement portion and that acknowledgement portion has been received by the target device. For example, the target device may receive the data portion associated with transaction A and write it to a particular address, for example, specified in the request portion of transaction A. However, the target device does not finalise the writing of the data, rendering it observable, until the acknowledgement portion associated with transaction A is received. In addition, the requestor device may control when the acknowledgement portion is issued, for example, based on an indication from the target device that a preceding data portion is either observable or that it will be observable once the request acknowledgement has been received. This approach has the advantage that the data is transmitted sooner reducing overall latency.

In some configurations there is provided a requestor device configured to issue transaction requests to be serviced by a target device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable. The requestor device is configured to maintain control information taking a first value to dynamically enable the ordered write observation behaviour when implementing the request ordering protocol, and the control information taking a second value to dynamically disable the ordered write observation behaviour when implementing the request ordering protocol. In some configurations, the provision of the control information and the dynamic determination as to whether or not data is deferred may be controlled by the requestor device which may then be provided to a system implementing the request ordering protocol but having legacy target devices.

In some configurations there is provided a target device configured to service transaction requests issued by a requestor device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable, when implementing the request ordering protocol, the target device is responsive to control information taking a first value to dynamically enable the ordered write observation behaviour, and the one or more target devices are responsive to the control information taking a second value to dynamically disable the ordered write observation behaviour. In some configurations, the response to the control information and the dynamic determination as to whether or not data is deferred may be controlled by the target device which may then be provided to a system implementing the request ordering protocol but having legacy requestor devices. For example, the target device may exhibit a default behaviour for legacy devices. In some configurations the default behaviour may be to have the ordered write observation behaviour enabled for legacy devices. In alternative configurations, or for different types of legacy devices, the default behaviour may be to have the ordered write observation behaviour disabled.

The request ordering protocol may be any protocol known to the person of ordinary skill in the art. However, in some configurations, the request ordering protocol is the Advanced extensible Interface (AXI) protocol. The AXI protocol defines the interaction (the signals and timing) between requestor devices (also referred to as manager devices) and target devices (also referred to as subordinate devices). The AXI protocol defines a plurality of channels between requestor devices and target devices including a write address channel, a write data channel, a write response channel, a read address channel and a read data channel. The AXI protocol specifies write operations as using the following channels: the requestor device sends the request portion including a write address on the write address channel and transfers data on the write data channel to the target device. The target device writes the received data to the specified address. Once the target device has completed the write operation, it responds with a message to the requestor device on the write response channel. The AXI protocol specifies read operations as using the following channels: the requestor sends the address it wants to read on the read address channel. The target device sends the data from the requested address to the requestor on the read data channel. The target device may also return an error message on the read data channel in the event that an error occurs, for example, the address is not valid, the data is corrupted, or the access request does not include the correct security permission.

Particular configurations will now be described with reference to the figures.

FIG. 1 schematically illustrates an apparatus 10 according to some configurations of the present techniques. The apparatus 10 includes a requestor device 12(A) and (optionally) further requestor devices including a first further requestor device 12(B) and a second further requestor device 12(C). The apparatus also includes a target device 16(A) and (optionally) a further target device 16(B). The requestor devices 12 each store control data 14 including control data 14(A) stored by requestor device 12(A), control data 14(B) stored by requestor device 12(B), and control data 14(C) stored by requestor device 12(C). The control data 14 is indicative as to whether an ordered write observation behaviour is enabled for that requestor device. The requestor devices 12 and the target devices 16 are arranged to communicate with one another according to a request ordering protocol specifying signals and timing that are used for transmission of read requests and write requests as transaction requests between the requestor devices 12 and the target devices 14. The request ordering protocol specifies an ordered write observation behaviour in which the requestor devices 12 and the target devices 16 are arranged to communicate such that a sequence of write transactions is observed to occur in the same order in which they are issued. The requestor devices 12 and the target devices 16 are dynamically responsive to the control data 14 to either enable or disable the ordered write observation behaviour dependent on the value of the control data 14 associated with the requestor device 14 issuing the write transactions.

Figure 2:
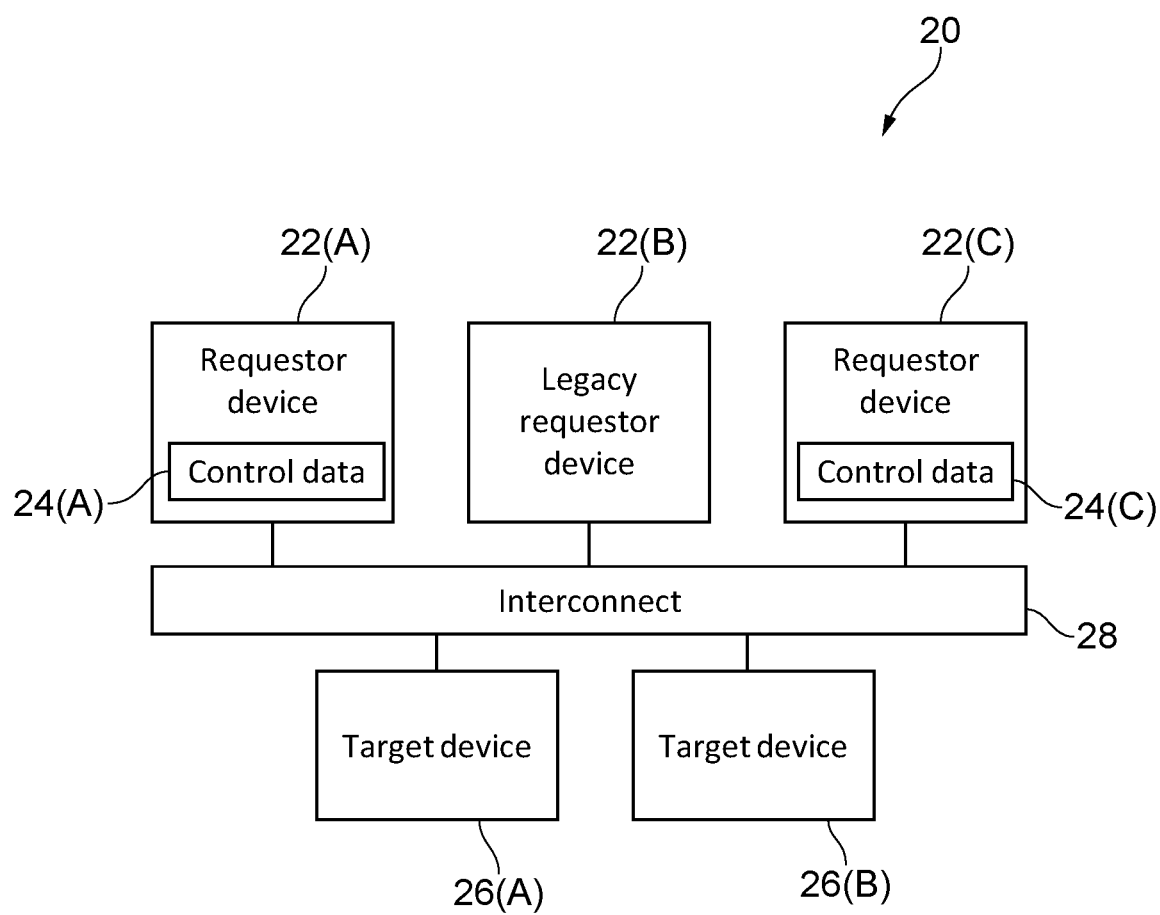
FIG. 2 schematically illustrates an apparatus according to some configurations of the present techniques.

FIG. 2 schematically illustrates an apparatus 20 according to some configurations of the present techniques. The apparatus 20 includes requestor devices 22 comprising a first requestor device 22(A) storing control data 24(A), a second requestor device 22(B) which is a legacy requestor device, and a third requestor device 22(C) storing control data 24(C). The second requestor device 22(B), as a legacy requestor device, does not store control data. The requestor devices 22 are connected to target devices 26 via an interconnect 28. The target devices include a first target device 26(A) and a second target device 26(B). The requestor devices 22 communicate with the target devices 26 using the request ordering protocol. The first requestor device 22(A) and the third requestor device 22(C) store control data 24 which is used to determine whether or not the ordered write observation behaviour is enabled for write transactions grouped into a same group for those requestor devices 22. The legacy requestor device 22(B) does not store control data and therefore is not able to dynamically switch ordered write observation on and off. Rather, for the legacy device 22(B), a state of the ordered write observation behaviour (e.g., enabled or disabled) may be implicitly determined, for example, the ordered write observation behaviour may always be on when the legacy device 22(B) is implementing the request ordering protocol. The interconnect 28 provides a bridge between the requestor devices 22 and the target devices 26. For example, where the request ordering protocol is the AXI protocol, the interconnect provides a write address channel, a write data channel, a write response channel, a read address channel and a read data channel between each of the requestor devices and each of the target devices 26.

Figure 3:
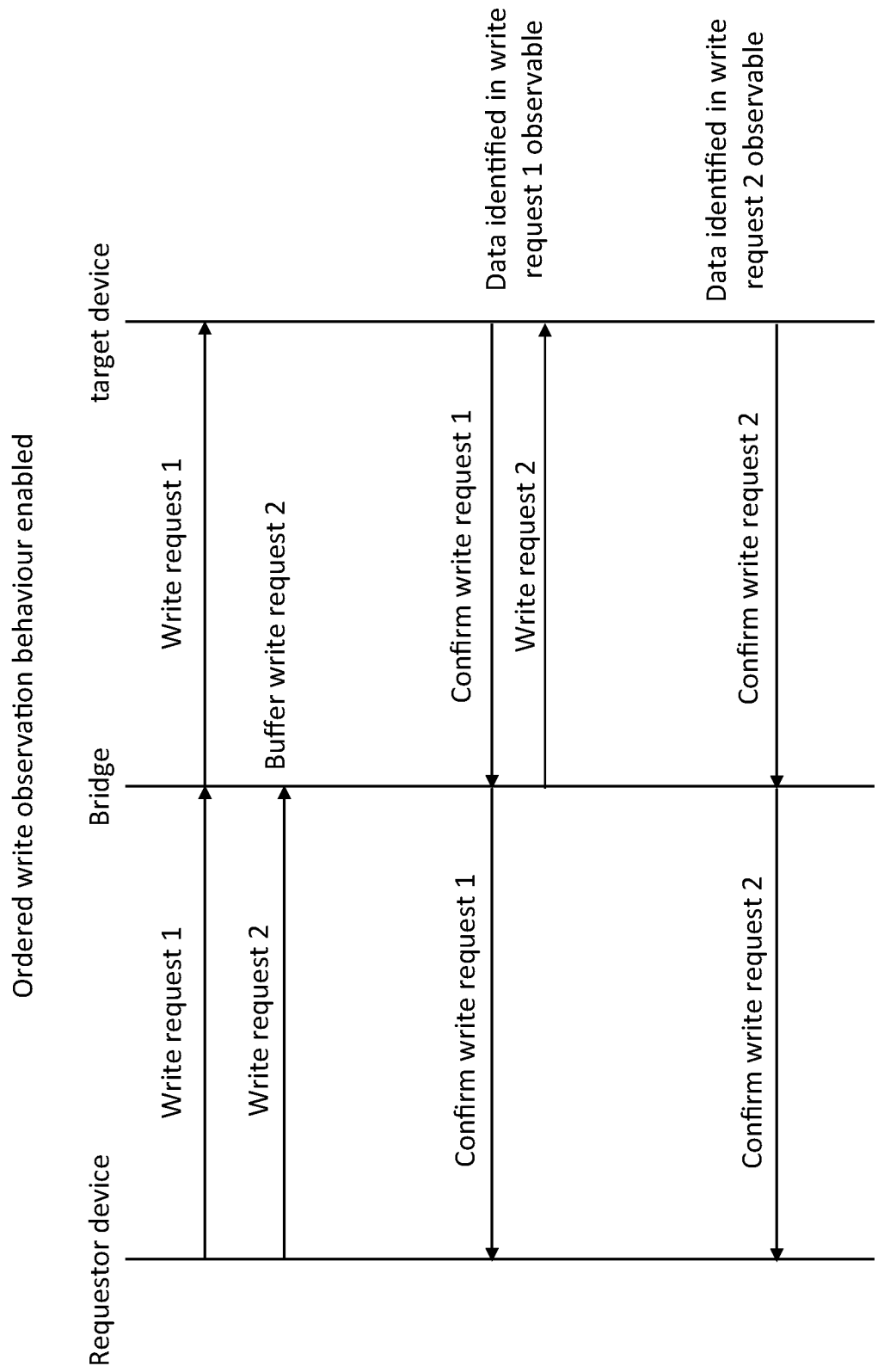
FIG. 3 schematically illustrates interactions between a requestor device and a target device according to some configurations of the present techniques.

FIG. 3 schematically illustrates an interaction between a requestor device and a target device via a bridge for a case in which the ordered write observation behaviour is enabled. The requestor device issues a first write request (write request 1). The first write request is transferred to the bridge and is then transferred from the bridge to the target device. The target device receives the first write request and communicates with the requestor device to begin writing data specified in the first write request. Before the target device has completed communicating with the requestor device to write the data, the requestor device issues a second write request (write request 2) which is issued to the bridge. Because the ordered write observation behaviour is enabled and because the target device has not confirmed that the data identified in the first write request is observable, the second write request is buffered by the bridge and is not transmitted to the target device. The target device continues to communicate with the requestor device to write the data identified in the first write request and, once the data are observable, transmits a confirmation request to the requestor device via the bridge. Once the confirmation request has been transmitted, the bridge forwards the second write request to the target device which communicates with the requestor device, via the bridge, to write the data identified in the second write request. Once the data identified in the second write request is observable, the target device transmits a confirmation of this to the requestor device via the bridge.

Figure 4:
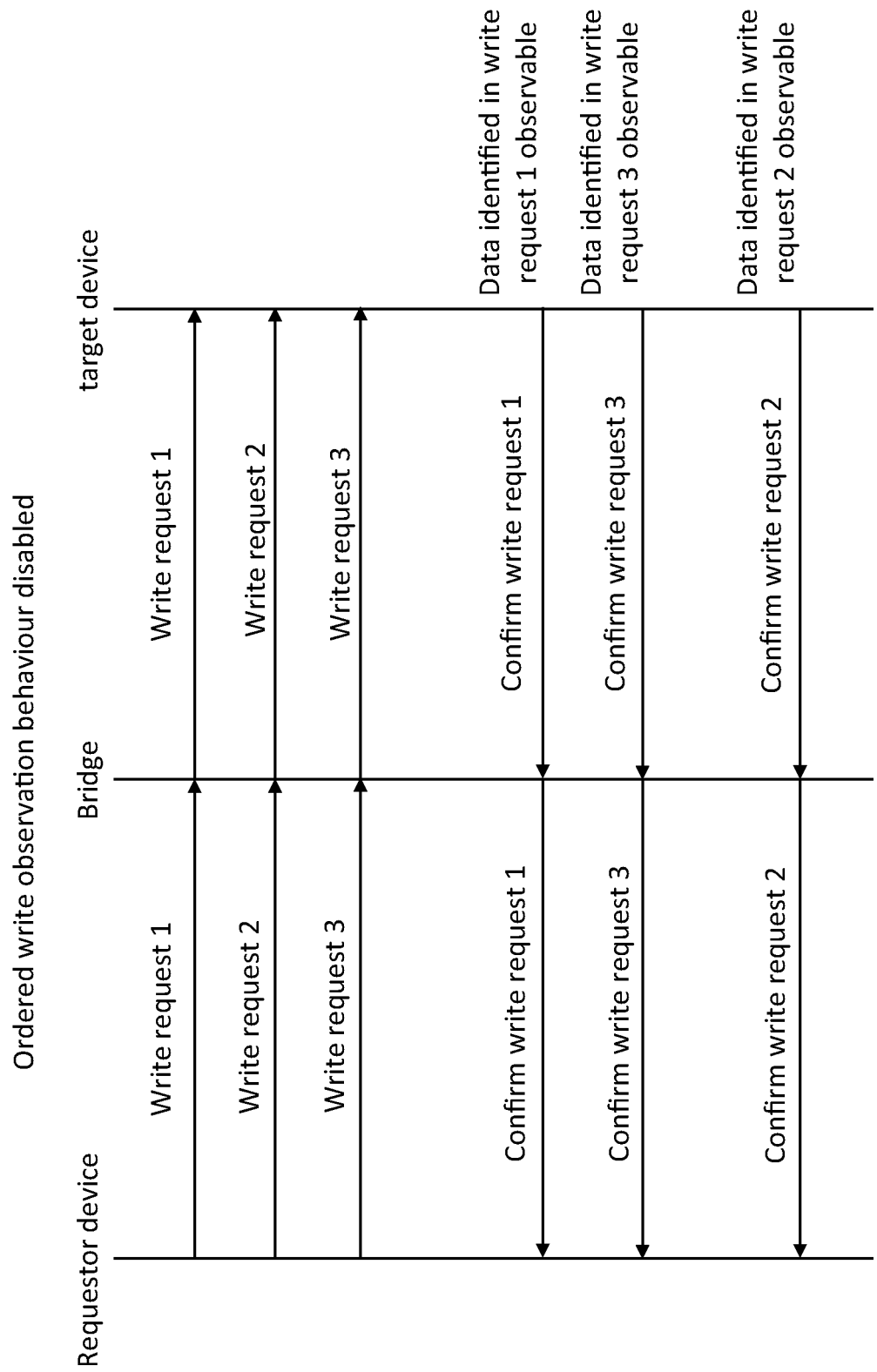
FIG. 4 schematically illustrates interactions between a requestor device and a target device according to some configurations of the present techniques.

FIG. 4 schematically illustrates an interaction between a requestor device and a target device via a bridge for a case in which the ordered write observation behaviour is disabled. The requestor device issues a first write request (write request 1). The first write request is transferred to the bridge and is then transferred from the bridge to the target device. The target device receives the first write request and communicates with the requestor device to begin writing data specified in the first write request. The requestor device issues a second write request (write request 2). The second write request is transferred to the bridge and is then transferred from the bridge to the target device. The target device receives the second write request and communicates with the requestor device to begin writing data specified in the second write request. The requestor device issues a third write request (write request 3). The third write request is transferred to the bridge and is then transferred from the bridge to the target device. The target device receives the third write request and communicates with the requestor device to begin writing data specified in the third write request. Because the requestor and the target devices are implementing the request ordering protocol, the write requests are transferred to the target device in the order that they are issued by the requestor device. However, because the ordered write observation behaviour is disabled, there is no guarantee that the write requests will become observable in the order in which they have been issued. In the illustrated example, the data identified in write request 1 becomes observable first and the observability of this data is confirmed through a confirmation request transmitted from the target device, via the bridge, to the requestor device. However, the next data that becomes observable is the data identified in the third write request which becomes observable after the data identified in the first write request but before the data identified in the second write request. When the data identified in the third write request becomes observable, the target device issues a confirmation, via the bridge, to the requestor device. Subsequently, the data identified in the second write request becomes available and the target device issues a confirmation, via the bridge, to the requestor device. As a result, because the ordered write observation behaviour is disabled, the data that is identified in the three sequential write request is made observable in a different order to the order in which the requests were issued.

It would be readily apparent to the person of ordinary skill in the art that the order in which the write requests were completed in the illustrated example of FIG. 4 has been selected for illustrative purpose only. The order in which the data is written may be dependent on, for example, an amount of the data transmitted, the addresses to which the data is to be written, and the utilisation of the target device. Because the ordered write observation behaviour is disabled, the data may be written either in the order in which the requests issued or in an order that is different to the order in which the requests issued.

Figure 5A:
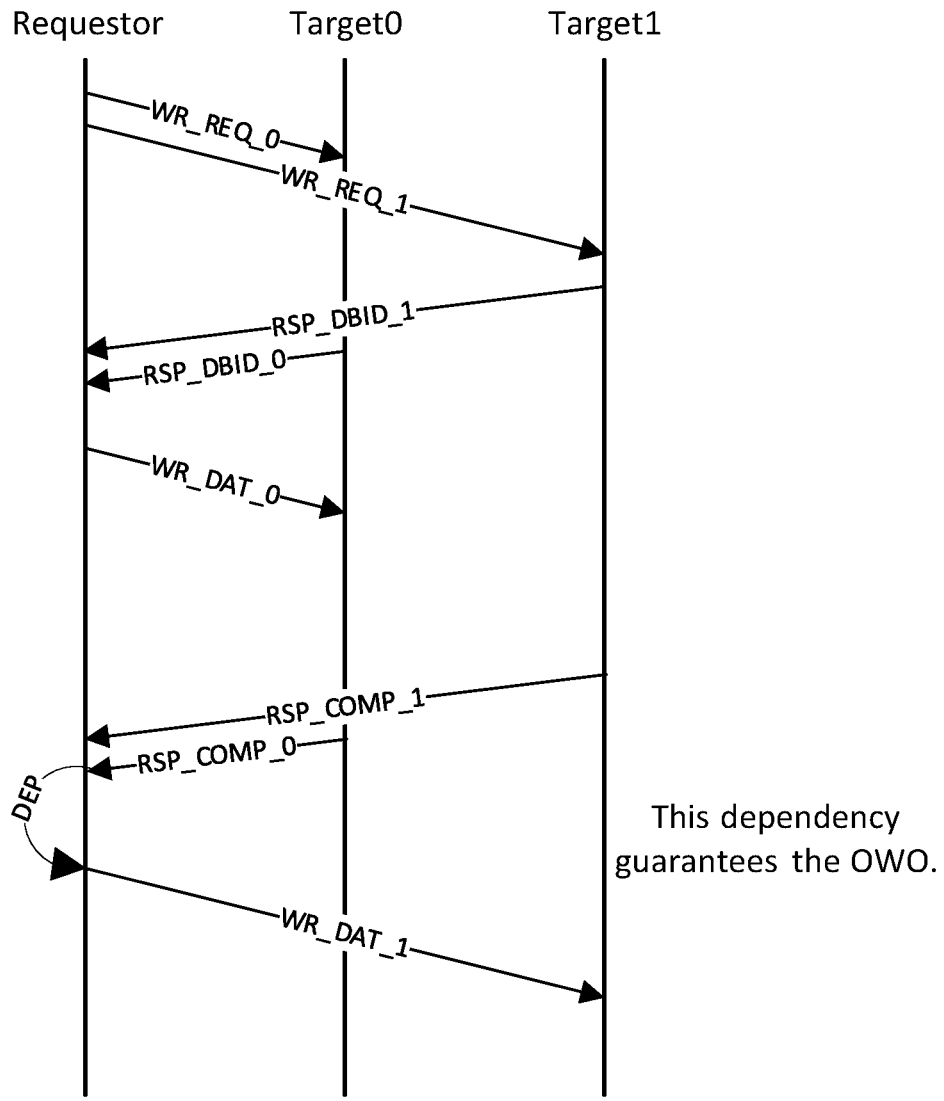
FIG. 5a schematically illustrates interactions between a requestor device and target devices according to some configurations of the present techniques FIG. 5b schematically illustrates interactions between a requestor device and target devices according to some configurations of the present techniques FIG. 6 schematically illustrates a sequence of steps carried out according to some configurations of the present techniques.
Figure 5B:
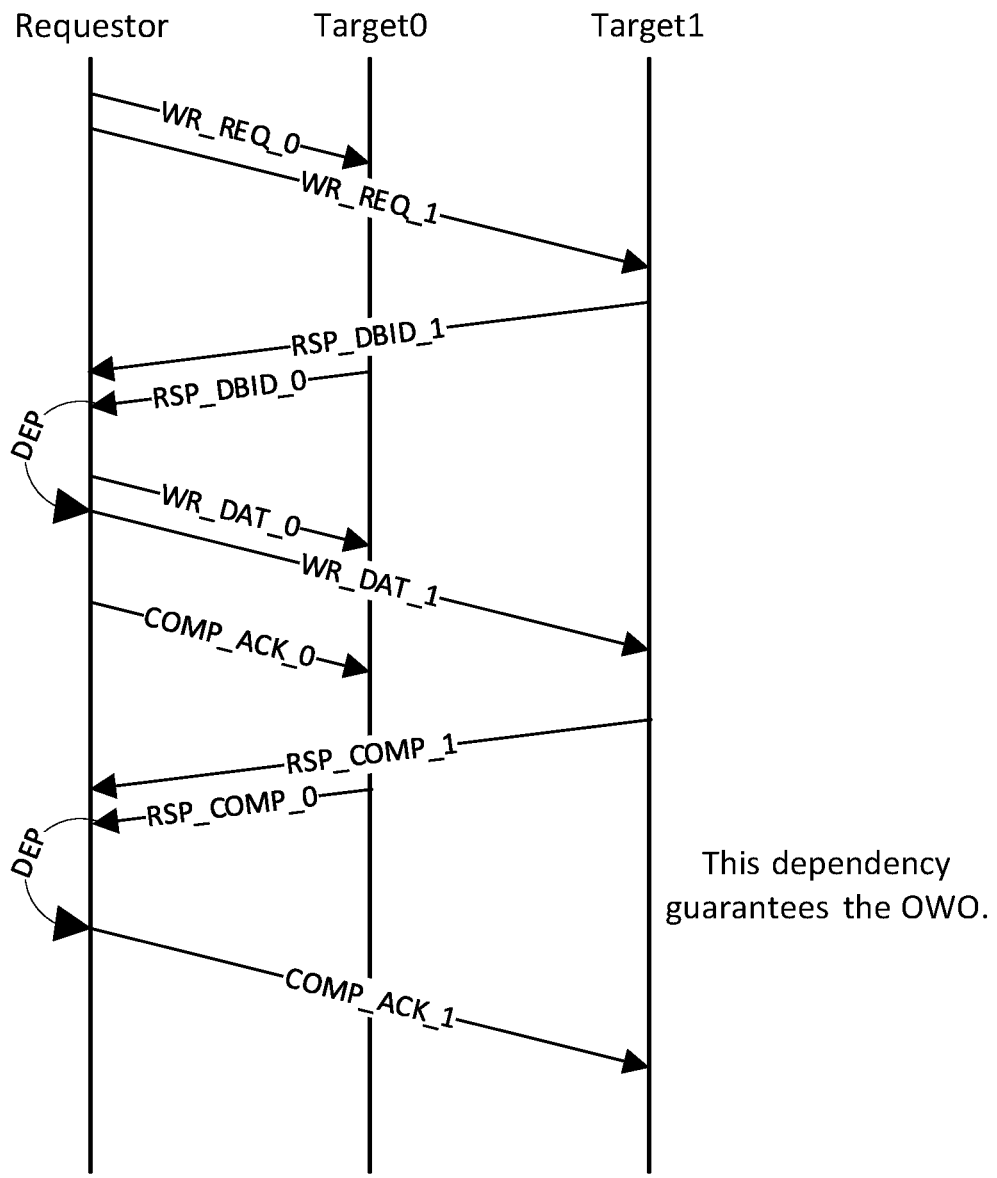

FIGS. 5a and 5b schematically illustrate two different methods by which the ordered write observation (OWO) behaviour may be enforced. FIG. 5a illustrates a first method in which a requestor device is interacting with two target devices, target0 and target1. In the illustrated configuration the requestor device is issuing two write transactions, one to each of the target devices, and the ordered write observation behaviour is enabled. As a first step, the requestor issues a request portion of the first transaction request to target0 (WR_REQ_0) specifying addresses to which the data specified in the first transaction will be written. The requestor then issues a second request to target 1 (WR_REQ_1) specifying addresses to which the data specified in the second transaction will be written. Target1 responds first with an identifier for the second transaction (RSP_DBID_1). Target0 responds second with an identifier for the first transaction (RSP_DBID_0). It would be readily apparent to the person of ordinary skill in the art that these responses may be received by the requestor in any order. The requestor is configured to implement the ordered write observation behaviour as part of the request ordering protocol and therefore issues the data portion of the first transaction (WR_DAT_0) to target0 before the data portion associated with the second transaction. The data portion of the first transaction specifies the identifier for the first transaction (RSP_DBID_0). Target0 receives the data portion of the first transaction and writes the data to the addresses provided in the request portion of the first transaction request (WR_REQ_0). Whilst the data associated with the first transaction are being written, target1 responds with a confirmation signal (RSP_COMP_1) indicating that the data (that has not yet been transmitted) identified in the second transaction request will be observable. It is noted that this does not necessarily mean that the data can be observed at that instant (indeed, the data associated with this transaction has not yet been transmitted to target1). Rather, the indication that the data identified in the second transaction request will be observable indicates that target1 will not service any read requests to the addresses identified in the second transaction request until the data associated in the second transaction requests has been written. Once the data portion of the first transaction has been written and is observable, target0 transmits a confirmation to the requestor (RSP_COMP_0) indicating that this is the case. The requestor receives the confirmation and transmits the data portion of the second transaction request (WR_DAT_1) to target 1. In this way, the requestor devices and target devices are able to ensure that data associated with the second transaction request is not observable before data associated with the first transaction request.

FIG. 5b schematically illustrates an alternative configuration for ensuring ordered write observability. In the illustrated configuration, each transaction request comprises a request portion, a data portion, and an acknowledgement portion. The target devices are configured to ensure that the data associated with a transaction is not observable until the acknowledgement portion associated with that transaction is received. As in FIG. 5a the requestor issues two separate write transaction, a first write transaction to target0 and a second write transaction to target1. As a first step, the requestor issues a request portion of the first transaction request to target0 (WR_REQ_0) specifying addresses to which the data specified in the first transaction will be written. The requestor then issues a second request to target 1 (WR_REQ_1) specifying addresses to which the data specified in the second transaction will be written. Target1 responds first with an identifier for the second transaction (RSP_DBID_1). Target0 responds second with an identifier for the first transaction (RSP_DBID_0). It would be readily apparent to the person of ordinary skill in the art that these responses may be received by the requestor in any order. The requestor is configured to implement the ordered write observation behaviour as part of the request ordering protocol and therefore issues the data portion of the first transaction (WR_DAT_0), specifying the identifier for the first transaction (RSP_DBID_0), to target0 before issuing the data portion of the second transaction. Target0 receives the data portion of the first transaction and writes the data to the addresses provided in the request portion of the first transaction request (WR_REQ_0). Due to the request ordering protocol, the requestor is required to issue the data portion of each of the transactions in the order that the request portions were issued. Once the data portion of the first transaction has been issued, the requestor is able to issue the data portion of the second transaction (WR_DAT_1) to target1. Target1 receives the data portion of the second transaction and writes the data to the addresses provided in the request portion of the second transaction request (WR_REQ_1). Because there are no transaction requests that precede the first transaction, the requestor issues the acknowledgement portion of the first transaction (COMP_ACK_0) to target0 so that target0 knows that the data portion of the first request should be made observable as soon as it is written. Because no acknowledgement portion relating to the second transaction has been issued, target1 will not make the transaction data of the second write transaction observable once it has been written. Once target1 has written the data associated with the second transaction it transmits a confirmation to the requestor (RSP_COMP_1) indicating that this is the case. The transaction data associated with the second transaction is ready to be made observable once an acknowledgement is received from the requestor. Once target0 has written the data associated with the first transaction it transmits a confirmation to the requestor (RSP_COMP_0) indicating that this is the case. Once the requestor has received the confirmation relating to the first transaction (RSP_COMP_0) the requestor can be confident that the data associated with the first transaction is observable. The requestor then transmits the acknowledgement portion of the second transaction (COMP_ACK_1) to target1 to cause target1 to make the data portion of the second transaction observable. In this way, the requestor devices and target devices are able to ensure that data associated with the second transaction request is not observable before data associated with the first transaction request.

It would be readily apparent to the person of ordinary skill in the art that the transaction groups could include more than two transactions and that the target devices target0 and target1 may be the same target device or two different target devices of a plurality of target devices. The timing of the signals provided between the different target devices and the requestor devices is for illustrative purpose and in some alternative use cases, the delay associated with data writing and the timing of the transmission of the identifiers, data, and/or confirmation signals may vary in accordance with the request ordering protocol and/or system conditions.

Figure 6:
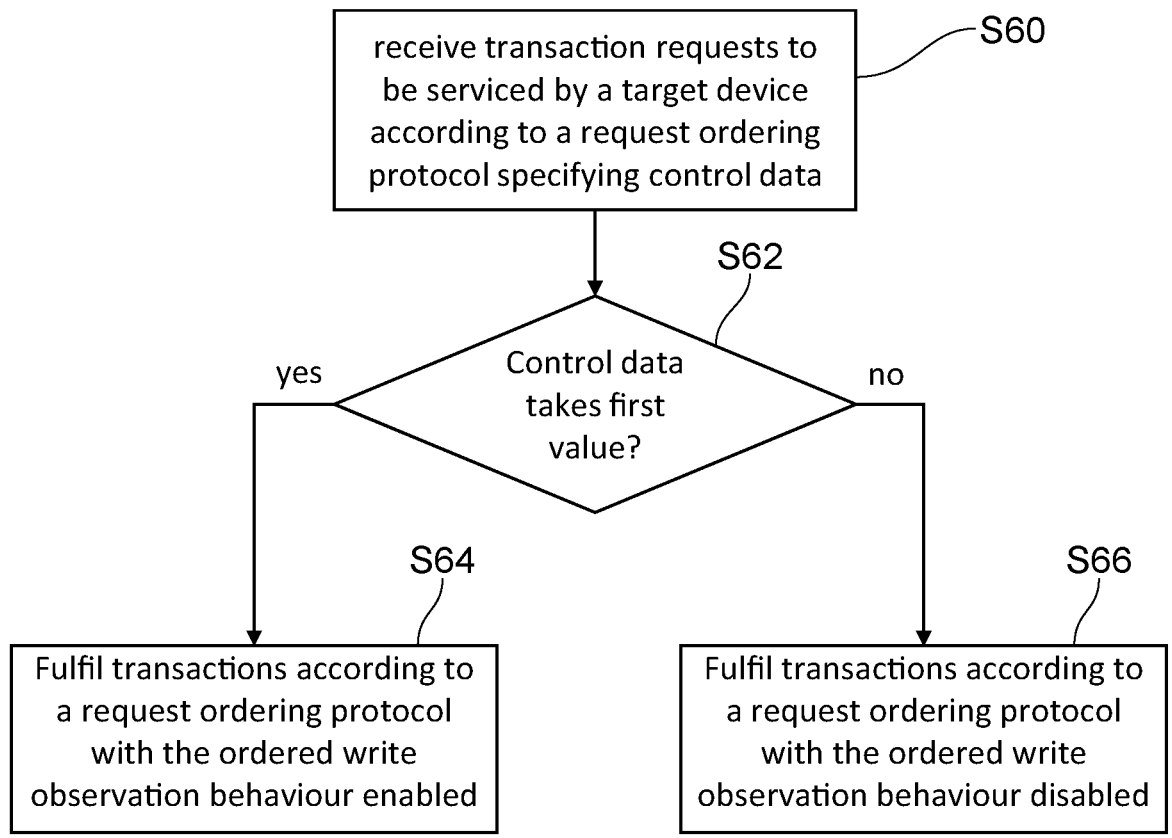

FIG. 6 schematically illustrates a sequence of steps carried out according to some configurations of the present techniques. Flow begins at step S60 where a transaction request to be serviced by a target device according to a request ordering protocol is received. The transaction request specifies control data. Flow then proceeds to step S62 where it is determined if the control data takes a first value. If, at step S62, it is determined that the control data takes the first value, then flow proceeds to step S64 where the transaction request is fulfilled according to a request ordering protocol in which the ordered write observation behaviour is enabled. If, at step S62, it was determined that the control data does not take the first value, then flow proceeds to step S66 where the transaction is fulfilled according to the request ordering protocol with the ordered write observation behaviour disabled.

Figure 7:
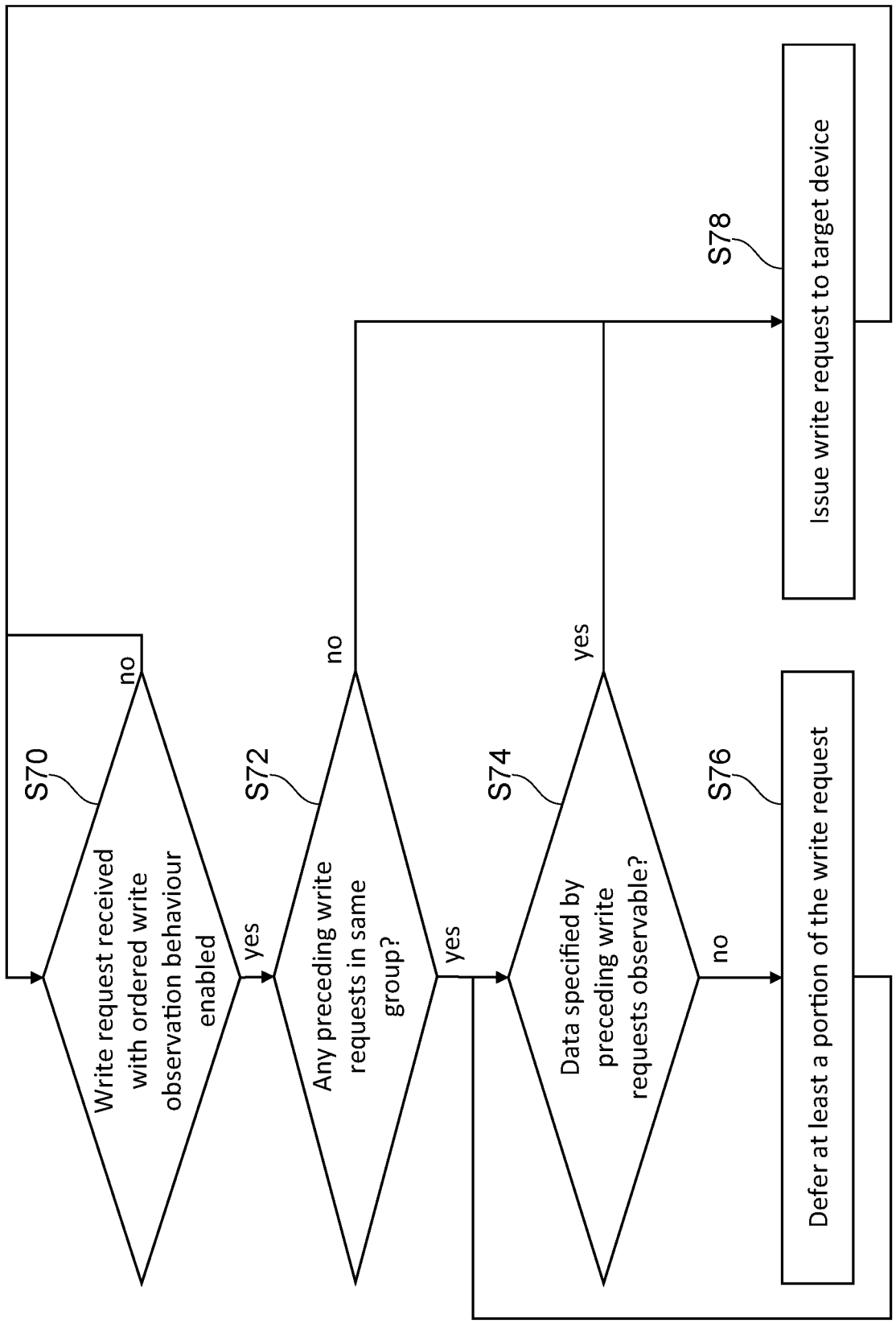
FIG. 7 schematically illustrates a sequence of steps carried out according to some configurations of the present techniques.

FIG. 7 schematically illustrates a sequence of steps carried out according to some configurations of the present techniques. Flow begins at step S70 where it is determined whether a write request has been received in which the ordered write observation behaviour is enabled. If, at step S70, it is determined that no such request has been received, then flow remains at step S70. If, at step S70, it is determined that a write request has been received with the ordered write observation behaviour enabled, then flow proceeds to step S72. At step S72 it is determined whether the received write request is in a same group as any preceding write requests. If, at step S72, it is determined that there are preceding write requests in the same request group as the write request, then flow proceeds to step S74. At step S74 it is determined if data specified by the preceding write requests are observable. If, at step S74, it is determined that the data specified by the preceding write requests are not observable, then flow proceeds to step S76 where at least a portion of the write request is deferred before returning to step S74. If, at step S72, it was determined that there no preceding write requests in the same group then flow proceeds to step S78 where the write request is issued to the target device before flow returns to step S70. If, at step S74, if it is determined that the data specified by the preceding write requests are observable then flow proceeds to step S78 where the write request is issued to the target device before flow returns to step S70.

Figure 8:
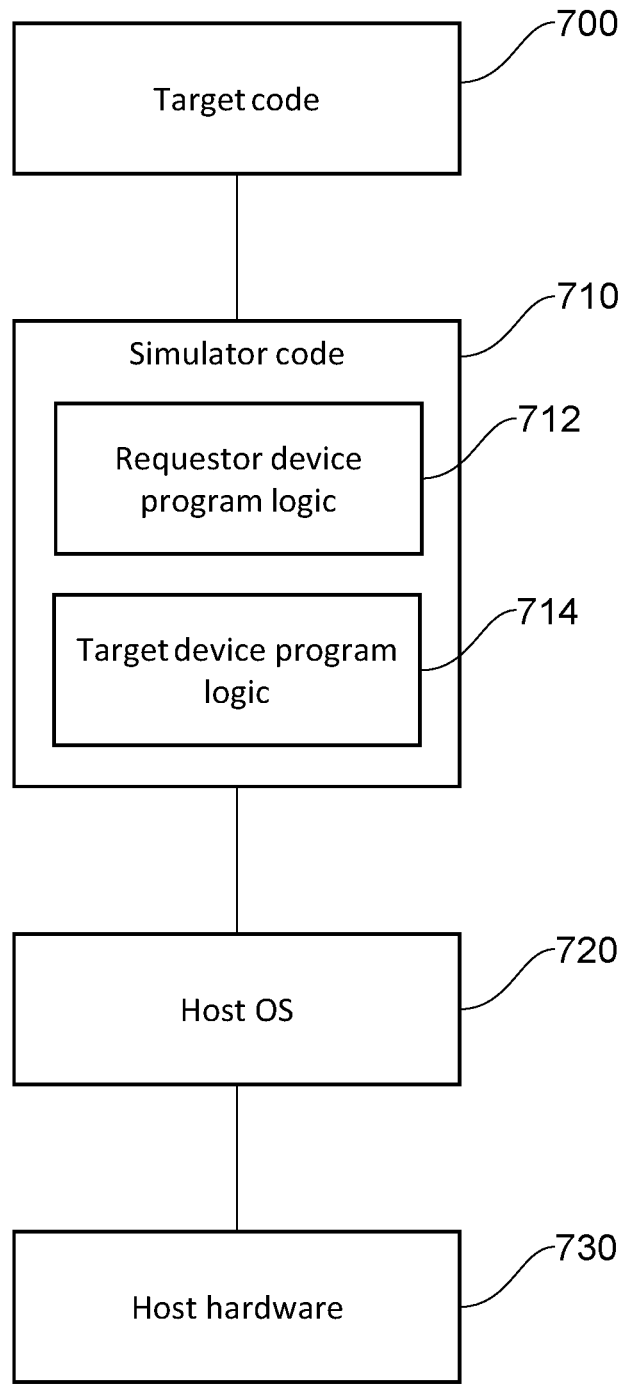
FIG. 8 schematically illustrates a simulator implementation that may be used according to some configurations of the present techniques.

FIG. 8 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the interface of the hardware architecture being modelled by the simulator program 710. Thus, the program instructions of the target code 700 may be executed from within the instruction execution environment using the simulator program 710, so that a host computer 730 which does not actually have the hardware features of the apparatus 10 or the apparatus 20 discussed above can emulate these features.

For example, the simulator program may specify one or more instance of requestor device program logic and/or one or more instances of target device program logic 714. The requestor device program logic 712 and the target device program logic 714 may be specified to emulate the features of, for example, the apparatus 10 as described in relation to FIG. 1, or the apparatus 20 described in relation to FIG. 2.

In brief overall summary there is provided an apparatus, a method, and a storage medium. The apparatus comprises one or more requestor devices to issue transaction requests, and one or more target devices to service those requests. The requestor devices and the target devices are configured to fulfil the requests according to a request ordering protocol specifying an ordered write observation behaviour in which, for each write transaction in a group of ordered write transactions, at least a deferred portion of the write transaction is deferred until all data specified in the group of ordered write transactions preceding the write transaction are observable. When implementing the request ordering protocol, the target devices are responsive to control information taking a first value to dynamically enable the ordered write observation behaviour, and the one or more target devices are responsive to the control information taking a second value to dynamically disable the ordered write observation behaviour.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some configurations of the present techniques may also be described by the following numbered clauses:

Clause 1. An apparatus comprising:
    one or more requestor devices each configured to issue transaction requests; and
    one or more target devices configured to service the transaction requests,
    wherein:
    the one or more requestor devices and the one or more target devices are configured to fulfil the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction are observable; and
    when implementing the request ordering protocol, the one or more target devices are responsive to control information taking a first value to dynamically enable the ordered write observation behaviour, and the one or more target devices are responsive to the control information taking a second value to dynamically disable the ordered write observation behaviour.

Clause 2. The apparatus of clause 1, wherein at least one of the one or more requestor devices is configured to identify a configuration register and the control information is stored in the configuration register.

Clause 3. The apparatus of any preceding clause, wherein the control information is dependent on the requestor device issuing the transaction request.

Clause 4. The apparatus of any preceding clause, wherein the control information is dependent on a type of the requestor device issuing the transaction request.

Clause 5. The apparatus of any preceding clause, wherein the control information is identified on a per transaction request basis.

Clause 6. The apparatus of any preceding clause, wherein the one or more requestor devices are coupled to the one or more target devices via at least one bridge, and the at least one bridge is configured, when the ordered write observation behaviour is enabled, to buffer the deferred portion until all data specified in the write transactions preceding the write transaction are observable.

Clause 7. The apparatus of any preceding clause, wherein:
    each of the transaction requests specifies a transaction group identifier identifying the group of ordered write transactions and transaction requests specifying a same transaction group identifier are issued by the requestor device in order; and the ordering protocol allows transaction requests specifying a first transaction group identifier to be fulfilled out of order relative to transaction requests specifying a second transaction group identifier different to the first transaction group identifier.

Clause 8. The apparatus of clause 7, wherein the control information is specified on a transaction group identifier basis.

Clause 9. The apparatus of any preceding clause, wherein the request ordering protocol specifies at least one ordering constraint to be applied independent of the control information.

Clause 10. The apparatus of clause 9, wherein the at least one ordering constraint comprises a read ordering constraint.

Clause 11. The apparatus of clause 9 or clause 10, wherein the at least one ordering constraint comprises a write ordering constraint requiring that each write transaction in the group of ordered write transactions is issued to the target device in order.

Clause 12. The apparatus of any preceding clause, wherein the request ordering protocol allows transaction requests issued by a first requestor device to be fulfilled out of order relative to transaction requests issued by a second requestor device.

Clause 13. The apparatus of any preceding clause, wherein the write transaction comprises a request portion and a data portion, and the request portion is permitted to proceed without deferral.

Clause 14. The apparatus of clause 13, wherein the deferred portion is the data portion.

Clause 15. The apparatus of clause 13, wherein the write transaction comprises an acknowledgement portion, and the deferred portion is the acknowledgement portion.

Clause 16. A method of operating the apparatus of any preceding clause, the method comprising:
  fulfilling the transaction requests according to the request ordering protocol; and when implementing the request ordering protocol, dynamically enabling the ordered write observation in response to the control information taking the first value, and dynamically disabling the ordered write observation behaviour in response to the control information taking the second value.

Clause 17. A method of operating an apparatus comprising: one or more requestor devices each configured to issue transaction requests, and one or more target devices configured to service the transaction requests, the method comprising
  fulfilling the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable; and
  when implementing the request ordering protocol, dynamically enabling the ordered write observation in response to control information taking a first value, and dynamically disabling the ordered write observation behaviour in response to the control information taking a second value.

Clause 18. A non-transitory computer readable storage medium storing program instructions for controlling a host data processing apparatus to provide an instruction execution environment comprising:
  one or more instances of requestor device program logic each configured to issue transaction requests; and
  one or more instances of target device program logic configured to service the transaction requests,
  wherein:
  the one or more instances of requestor device program logic and the one or more instances of target device program logic are configured to fulfil the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable; and
  when implementing the request ordering protocol, the one or more instances of target device program logic are responsive to control information taking a first value to dynamically enable the ordered write observation behaviour, and the one or more instances of target device program logic are responsive to the control information taking a second value to dynamically disable the ordered write observation behaviour.

Clause 19. A requestor device configured to issue transaction requests to be serviced by a target device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable,
  wherein the requestor device is configured to maintain control information taking a first value to dynamically enable the ordered write observation behaviour when implementing the request ordering protocol, and the control information taking a second value to dynamically disable the ordered write observation behaviour when implementing the request ordering protocol.

Clause 20. A method of operating the requestor device of clause 19, the method comprising:
  issuing transaction requests to be serviced by the target device according to the request ordering protocol; and
  maintaining control information taking the first value to dynamically enable the ordered write observation behaviour when implementing the request ordering protocol, and the control information taking the second value to dynamically disable the ordered write observation behaviour when implementing the request ordering protocol.

Clause 21. A non-transitory computer readable storage medium storing program instructions for controlling a host data processing apparatus to provide an instruction execution environment comprising program logic representative of the apparatus of clause 19.

Clause 22. A target device configured to service transaction requests issued by a requestor device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable,
  wherein when implementing the request ordering protocol, the target device is responsive to control information taking a first value to dynamically enable the ordered write observation behaviour, and the one or more target devices are responsive to the control information taking a second value to dynamically disable the ordered write observation behaviour.

Clause 23. A method of operating a requestor device, the method comprising:
issuing transaction requests to be serviced by a target device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable; and
maintaining control information taking a first value to dynamically enable the ordered write observation behaviour when implementing the request ordering protocol, and the control information taking a second value to dynamically disable the ordered write observation behaviour when implementing the request ordering protocol.

Clause 24. A method of operating a target device comprising:
servicing transaction requests issued by a requestor device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable; and
when implementing the request ordering protocol, dynamically enabling the ordered write observation behaviour in response to control information taking a first value, and dynamically disabling the ordered write observation behaviour in response to the control information taking a second value.

Clause 25. A non-transitory computer readable storage medium storing program instructions for controlling a host data processing apparatus to provide an instruction execution environment comprising:
requestor device program logic configured to issue transaction requests to be serviced by target device program logic according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable,
wherein the requestor device program logic is configured to maintain control information taking a first value to dynamically enable the ordered write observation behaviour when implementing the request ordering protocol, and the control information taking a second value to dynamically disable the ordered write observation behaviour when implementing the request ordering protocol.

Clause 26. A non-transitory computer readable storage medium storing program instructions for controlling a host data processing apparatus to provide an instruction execution environment comprising:
target device program logic configured to service transaction requests issued by requestor device program logic according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable,
wherein when implementing the request ordering protocol, the target device program logic is responsive to control information taking a first value to dynamically enable the ordered write observation behaviour, and the target device program logic is responsive to the control information taking a second value to dynamically disable the ordered write observation behaviour.

We claim:

1. An apparatus comprising:
one or more requestor devices each configured to issue transaction requests; and
one or more target devices configured to service the transaction requests,
wherein:
the one or more requestor devices and the one or more target devices are configured to fulfil the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction are observable; and
when implementing the request ordering protocol, the one or more target devices are responsive to control information taking a first value to dynamically enable the ordered write observation behaviour, and the one or more target devices are responsive to the control information taking a second value to dynamically disable the ordered write observation behaviour.

2. The apparatus of claim 1, wherein at least one of the one or more requestor devices is configured to identify a configuration register and the control information is stored in the configuration register.

3. The apparatus of claim 1, wherein the control information is dependent on the requestor device issuing the transaction request.

4. The apparatus of claim 1, wherein the control information is dependent on a type of the requestor device issuing the transaction request.

5. The apparatus of claim 1, wherein the control information is identified on a per transaction request basis.

6. The apparatus of claim 1, wherein the one or more requestor devices are coupled to the one or more target devices via at least one bridge, and the at least one bridge is configured, when the ordered write observation behaviour is enabled, to buffer the deferred portion until all data specified in the write transactions preceding the write transaction are observable.

7. The apparatus of claim 1, wherein:
each of the transaction requests specifies a transaction group identifier identifying the group of ordered write transactions and transaction requests specifying a same transaction group identifier are issued by the requestor device in order; and
the ordering protocol allows transaction requests specifying a first transaction group identifier to be fulfilled out of order relative to transaction requests specifying a second transaction group identifier different to the first transaction group identifier.

8. The apparatus of claim 7, wherein the control information is specified on a transaction group identifier basis.

9. The apparatus of claim 1, wherein the request ordering protocol specifies at least one ordering constraint to be applied independent of the control information.

10. The apparatus of claim 9, wherein the at least one ordering constraint comprises a read ordering constraint.

11. The apparatus of claim 9, wherein the at least one ordering constraint comprises a write ordering constraint requiring that each write transaction in the group of ordered write transactions is issued to the target device in order.

12. The apparatus of claim 1, wherein the request ordering protocol allows transaction requests issued by a first requestor device to be fulfilled out of order relative to transaction requests issued by a second requestor device.

13. The apparatus of claim 1, wherein the write transaction comprises a request portion and a data portion, and the request portion is permitted to proceed without deferral.

14. The apparatus of claim 13, wherein the deferred portion is the data portion.

15. The apparatus of claim 13, wherein the write transaction comprises an acknowledgement portion, and the deferred portion is the acknowledgement portion.

16. A method of operating the apparatus of claim 1, the method comprising:
fulfilling the transaction requests according to the request ordering protocol; and
when implementing the request ordering protocol, dynamically enabling the ordered write observation in response to the control information taking the first value, and dynamically disabling the ordered write observation behaviour in response to the control information taking the second value.

17. A non-transitory computer readable storage medium storing program instructions for controlling a host data processing apparatus to provide an instruction execution environment comprising:
one or more instances of requestor device program logic each configured to issue transaction requests; and
one or more instances of target device program logic configured to service the transaction requests, wherein:
the one or more instances of requestor device program logic and the one or more instances of target device program logic are configured to fulfil the transaction requests according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable; and
when implementing the request ordering protocol, the one or more instances of target device program logic are responsive to control information taking a first value to dynamically enable the ordered write observation behaviour, and the one or more instances of target device program logic are responsive to the control information taking a second value to dynamically disable the ordered write observation behaviour.

18. A requestor device configured to issue transaction requests to be serviced by a target device according to a request ordering protocol specifying an ordered write observation behaviour in which, for each write transaction in a group of ordered write transactions, at least a deferred portion of the write transaction is deferred until all data specified in write transactions of the group of ordered write transactions preceding the write transaction is observable,
wherein the requestor device is configured to maintain control information taking a first value to dynamically enable the ordered write observation behaviour when implementing the request ordering protocol, and the control information taking a second value to dynamically disable the ordered write observation behaviour when implementing the request ordering protocol.

19. A method of operating the requestor device of claim 18, the method comprising:
issuing transaction requests to be serviced by the target device according to the request ordering protocol; and
maintaining control information taking the first value to dynamically enable the ordered write observation behaviour when implementing the request ordering protocol, and the control information taking the second value to dynamically disable the ordered write observation behaviour when implementing the request ordering protocol.

20. A non-transitory computer readable storage medium storing program instructions for controlling a host data processing apparatus to provide an instruction execution environment comprising program logic representative of the apparatus of claim 18.

* * * * *